G. G. MARSHALL.
AIR CIRCULATION CONTROLLING DEVICE FOR AUTOMOBILE RADIATORS.
APPLICATION FILED NOV. 21, 1919.
1,387,062.   Patented Aug. 9, 1921.
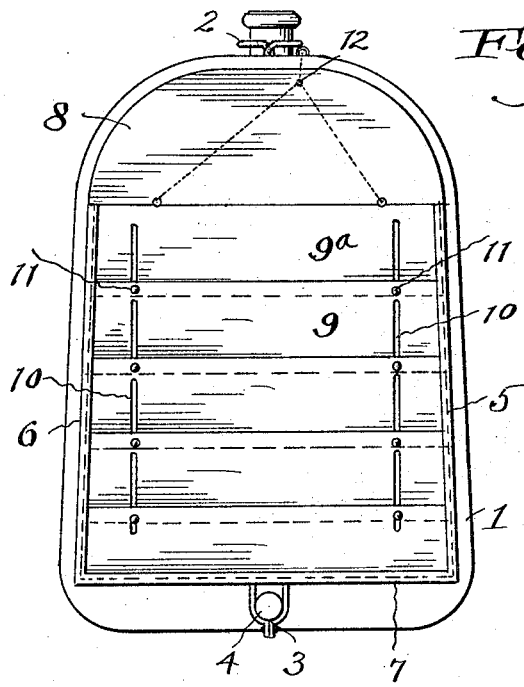
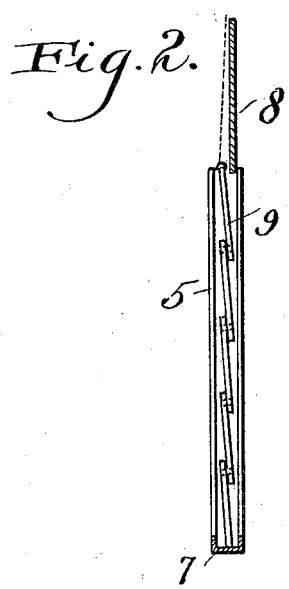
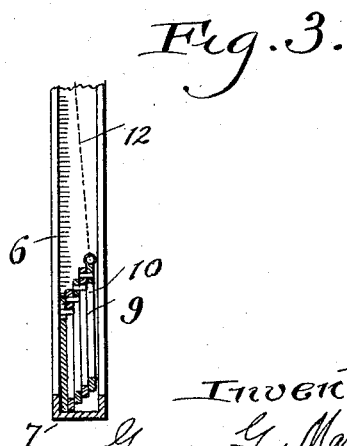
Inventor:
George G. Marshall.
By
Thurston Rivst Hudson
attys.

UNITED STATES PATENT OFFICE.

GEORGE G. MARSHALL, OF CLEVELAND HEIGHTS, OHIO.

AIR-CIRCULATION-CONTROLLING DEVICE FOR AUTOMOBILE-RADIATORS.

1,387,062.  Specification of Letters Patent.  Patented Aug. 9, 1921.

Original application filed December 26, 1918, Serial No. 268,378. Divided and this application filed November 21, 1919. Serial No. 339,594.

*To all whom it may concern:*

Be it known that I, GEORGE G. MARSHALL, a citizen of the United States, residing at Cleveland Heights, in the county of Cuyahoga and State of Ohio, have invented a certain new and useful Improvement in Air-Circulation-Controlling Devices for Automobile-Radiators, of which the following is a full, clear, and exact description.

The present invention relates to a device for use in connection with the radiator of automobiles. The device is intended and adapted to be attached to the front end of an automobile radiator and is equipped with movable shutters which may be moved to an adjusted position thereby to vary the amount of air which passes through the automobile radiator.

The construction of a device of the invention is of such character that it may be made of metal or other substantial material so that it will not readily wear out nor become broken.

A further object of the invention is to provide a structure in which the movable part which controls the passage of air, may be moved from the lower part of the radiator toward the upper part, thereby first covering and protecting the lower part of the radiator which is normally the coolest portion of the radiator of an automobile.

Further objects will appear as the description proceeds.

The present case is a division of my copending application, Serial No. 268,378.

Reference should be had to the accompanying drawings forming a part of this specification in which Figure 1 is a front elevation of the device as applied to an automobile radiator; Fig. 2 is a sectional elevation of the device; Fig. 3 is a sectional elevation of a portion of the device showing the shutters in collapsed position.

Referring to the drawings, 1 indicates the radiator of an automobile to which the device of this invention is shown attached. Various means may be used to attach the device to the radiator but in the present instance I have shown a securing member at the top indicated at 2 which fits over the usual filling spout of an automobile and at the lower portion there is a securing member 3 which engages with a tubular extension indicated at 4, which tubular extension houses a portion of the crank shaft which is adapted to receive a crank for turning over the engine at the starting thereof.

The device itself fits flat against the radiator and substantially entirely covers the front portion of the radiator so that no air can pass through the radiator except as it is controlled by the shutters of the device.

The device comprises a frame which has side members 5 and 6 and a bottom member 7. These side members 5 and 6 at their upper ends are joined by means of a plate 8 which in configuration is rounded upon the edges to conform to the usual shape of an automobile radiator.

The members 5 and 6 as well as the member 7 are preferably made channel shape in cross-section.

Extending between the side members 5 and 6 are shutters 9. There are a plurality of these shutters and the shutters are secured to each other by a sliding connection so that as the uppermost shutter $9^a$ is pulled upwardly, the connections between the shutters will successively raise all of the shutters so as to cover the opening between the side members 6.

Each of the shutters adjacent its opposite ends is provided with a slot 10. These slots extend transversely with respect to each shutter and at the upper portion of each of the shutters except the top one a pin, such as indicated at 11, is provided, which pin is adapted to extend into the slot of the shutter which is adjacent to it.

When the pin of any given shutter engages with the bottom of a slot of the shutter which is adjacent to it, a connection between the two shutters is effected so that movement of the first mentioned shutter will cause movement of the second shutter. Thus, when the topmost shutter is raised into the position shown in Fig. 1 the connection which has just been described will cause the other shutters to be raised and positioned as indicated in Fig. 1. The arrangement of the shutters is such that when in raised position there is a slight overlapping of each shutter at the lower portion thereof by an adjacent shutter.

The shutters at their opposite ends extend within the side walls of the channels which form the side members 5 and 6 so that the movement of the shutters as they are raised and lowered is guided by the side walls of these channel members. The shutters when lowered or collapsed, assume substantially the position shown in Fig. 3. By virtue of the slot and pin connection which has heretofore been described the shutter members are adapted to slide upon each other and spread out when the shutters are drawn upwardly as indicated in Fig. 1, and the front of the automobile is completely closed.

The top most shutter 9ª is connected with a cord or cable such as indicated at 12 which cable extends rearwardly toward the dashboard of the automobile and is arranged so as to be convenient for operation by the driver of the automobile, without necessity of leaving his seat.

As will be apparent from the foregoing description, the shutters when stacked on edge, indicated in Fig. 3, occupy a position at the lower portion of the frame in which they are mounted and in raising the shutters the lower portion of the radiator is first covered over so that the covering action takes place from the bottom of the radiator toward the top.

This arrangement is purposeful inasmuch as the lower portion of an automobile radiator is the portion which is the coolest, in the normal functioning of the radiator, consequently when it is necessary to control the passage of air through the radiator, it is desirable to cover over and protect the lowermost or coolest portion of the radiator first, and obviously the height to which the shutters may be raised, is controlled by the necessity for controlling the passage of air for the purpose of maintaining the desired temperature of the water within the radiator.

The foregoing description contemplates a construction which may be separately made and attached to an automobile radiator, however, obviously the form of the described device may be permanently attached to the radiator or incorporated as a part thereof, without in any way departing from the spirit of this invention.

Having described my invention, I claim—

1. An air controlling device adapted for mounting upon an automobile radiator, comprising a frame, having side members, a plurality of shutters extending transversely of the frame, coöperating means upon the frame and shutters for guiding the shutters as they are raised and lowered, each of the shutters being provided with a slot and a projection, the projection upon each shutter coöperating with a slot which is formed in a shutter adjacent, and means for raising the shutters.

2. An air controlling device adapted for mounting upon an automobile radiator, comprising a frame, having side members, which are channel shaped in cross-section, a plurality of shutters extending transversely of the frame, the ends of the shutters extending within the walls of the channels of the side members whereby the shutters are guided, each of the shutters being provided with a slot and a projection, the projection upon each shutter coöperating with a slot formed in an adjacent shutter and means for raising the shutters.

In testimony whereof, I hereunto affix my signature.

GEORGE G. MARSHALL.